(12) United States Patent
Nagino et al.

(10) Patent No.: US 11,975,292 B2
(45) Date of Patent: May 7, 2024

(54) ION PERMEABLE MEMBRANE

(71) Applicant: Panasonic Intellectual Property Management Co., Ltd., Osaka (JP)

(72) Inventors: Toshifumi Nagino, Osaka (JP); Syougo Utumi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 865 days.

(21) Appl. No.: 17/009,832

(22) Filed: Sep. 2, 2020

(65) Prior Publication Data

US 2021/0077953 A1 Mar. 18, 2021

(30) Foreign Application Priority Data

Sep. 18, 2019 (JP) ................................. 2019-169562
Jul. 20, 2020 (JP) ................................. 2020-123891

(51) Int. Cl.
| | | |
|---|---|---|
| *B01D 71/02* | (2006.01) | |
| *B01D 61/42* | (2006.01) | |
| *B01D 61/48* | (2006.01) | |
| *B01D 71/34* | (2006.01) | |
| *B01D 71/36* | (2006.01) | |

(52) U.S. Cl.
CPC ......... *B01D 61/485* (2013.01); *B01D 61/422* (2013.01); *B01D 71/02* (2013.01); *B01D 71/34* (2013.01); *B01D 71/36* (2013.01); *B01D 2325/0281* (2022.08); *B01D 2325/38* (2013.01)

(58) Field of Classification Search
CPC ...... B01D 71/024–05; B01D 71/30–36; B29K 2027/12–18
See application file for complete search history.

(56) References Cited

U.S. PATENT DOCUMENTS 4,183,988 A * 1/1980 Farrington .......... H01M 50/497
252/519.33
4,247,499 A * 1/1981 Glugla .................... B29C 70/64
264/294
9,853,324 B2 * 12/2017 Chan ................. H01M 10/0585
(Continued)

FOREIGN PATENT DOCUMENTS

| EP | 3 023 0138 | 5/2016 |
|---|---|---|
| JP | 2015-508937 | 3/2015 |

(Continued)

OTHER PUBLICATIONS

Feng et al, "Super-Hydrophobic Surface of aligned Polyacrylonitrile Nanofibers", Mar. 27, 2002, Angewandte Chemie International Edition, 41, 7, 1221-1223. (Year: 2002).*
(Continued)

*Primary Examiner* — Luan V Van
*Assistant Examiner* — Andrew Koltonow
(74) *Attorney, Agent, or Firm* — Wenderoth, Lind & Ponack, L.L.P.

(57) ABSTRACT

An ion permeable membrane includes ion conductor particles and a fiber base material, in which each of the ion conductor particles has a first portion embedded inside the fiber base material, and a second portion exposed on outside surfaces of the fiber base material, and the second portions are continuous between an upper surface and a lower surface in a thickness direction of the ion permeable membrane.

4 Claims, 7 Drawing Sheets

(56) References Cited

U.S. PATENT DOCUMENTS

2015/0099185 A1* 4/2015 Joo .................. D01F 9/20
429/231.95
2016/0201163 A1 7/2016 Hoshino

FOREIGN PATENT DOCUMENTS

KR 10-2013-0040621 4/2013
WO 2015/020121 2/2015

OTHER PUBLICATIONS

Zhang et al, "Synergistic Coupling between Li6.75La3Zr1.75Ta0.25O12 and Poly(vinylidene fluoride) Induces High Ionic Conductivity, Mechanical Strength, and Thermal Stability of Solid Composite Electrolytes", Sep. 12, 2017, Journal of the American Chemical Society, 139, 13779-13785. (Year: 2017).*

Extended European Search Report dated Jan. 20, 2021, in corresponding European Patent Application No. 20196099.4.

Janakiraman et al., "A new strategy of PVDF based Li-salt polymer electrolyte through electrospinning for litium battery application", Materials Research Express, vol. 6, No. 3, Dec. 5, 2018, p. 035303.

Huang et al., "Electrochemical Properties of LLTO/Fluoropolymer-Shell Cellulose-Core Fibrous Membrane for Separator of High Performance Lithium-Ion Battery", Materials, vol. 9, No. 2, Jan. 26, 2016, p. 75.

Office Action dated Jul. 25, 2023, in European Patent Application No. 20196099.4.

Braunger M.L. et al: "Electrical conductivity of silicate glasses with tetravalent cations substituting Si", Journal of Non-Crystalline Solids, vol. 358, No. 21, Oct. 1, 2012 (Oct. 1, 2012), pp. 2855-2861, XP093062548.

* cited by examiner

ION PERMEABLE MEMBRANE

BACKGROUND

1. Technical Field

The present disclosure relates to an ion permeable membrane.

2. Description of the Related Art

Although rare metals are indispensable for many high-tech devices such as mobile phones, smartphones, home electric appliances, and automobile parts, it is difficult to secure stable resources, so that rare metal recovery technique is drawing attention. In addition, a technique for reusing without discarding by adding a treatment step to the waste liquid that has been industrially discarded until now is also emphasized. Although it is common to use an ion exchange resin or an adsorbent for the rare metal recovery technique and a waste liquid reuse technique, in recent years, utilization of a separation technique using various functional membranes has been considered to be effective as an environment-friendly recovery and reuse process for building a recycling-based society.

In particular, in recent years, the importance of lithium (Li) in the industry as a raw material for a lithium-ion battery has increased. In particular, the Li-ion battery is adopted for electric vehicle (EV) applications, and a large amount of Li is being required as a raw material thereof. Although this Li can also be collected from ores or salt lakes in dry areas with high water evaporation, it is also known that Li is contained in seawater in a significantly large amount, and it is known that the total amount of Li contained in all the seawater on the earth is much larger than the ground reserve. In addition, similarly to other rare metals, studies are underway to recover Li from industrially discarded Li-ion batteries for the purpose of securing stable resources.

However, Li contains only approximately 0.2 mg per liter of seawater. In addition, the industrially discarded Li-ion battery contains many compounds such as nickel (Ni) or cobalt (Co), in addition to the Li. Therefore, it can be said that Li is a metal material that is difficult to efficiently recover from seawater or Li-ion batteries.

Against this background, in WO2015/020121, it is attempted to efficiently recover only Li from a stock solution including Li ions by using a selective permeation membrane that selectively permeates Li. In WO2015/020121, the selective permeation membrane that selectively permeates Li ions is a sintered body of an inorganic compound including Li, the sintered body having a size of approximately 5 cm square is joined in the in-plane direction to be integrated, and a selective permeation membrane having a substantially large area is disclosed.

SUMMARY

An ion permeable membrane according to one aspect of the present disclosure is an ion permeable membrane including ion conductor particles and a fiber base material, in which each of the ion conductor particles has a first portion embedded inside the fiber base material and a second portion exposed outside surfaces of the fiber base material, and the second portion of the ion conductor particles are continuous between an upper surface and a lower surface in a thickness direction of the ion permeable membrane.

DETAILED DESCRIPTIONS

Figure 1A:
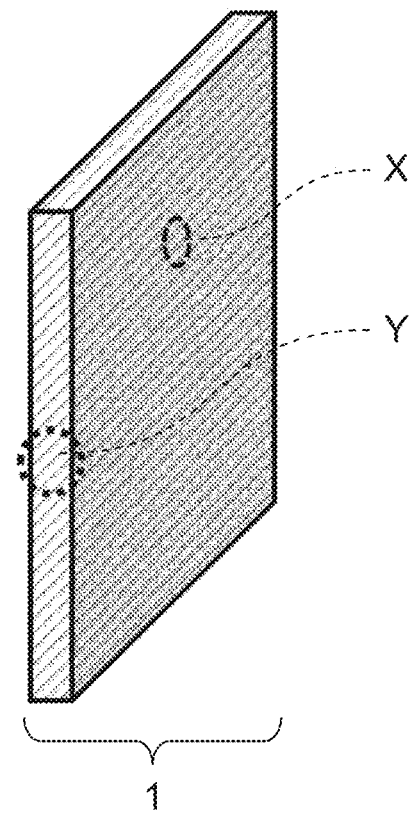
FIG. 1A is a schematic diagram of an ion permeable membrane according to an embodiment of the present disclosure.

In WO2015/020121, although a hardness of a sintered body is high, it is significantly brittle (brittle and easy to break), so that in a case where a large amount of stock solution is treated at high speed, there is a problem of cracking when high pressure is applied. In addition, similarly to the above joint, there is also a problem that the joining is broken when a high pressure is applied.

The present disclosure solves the above problems, and an object is to provide an ion permeable membrane having high durability that enables a high-speed treatment of a large amount of stock solution.

Hereinafter, an ion permeable membrane according to an embodiment of the present disclosure will be described with reference to the drawings. In the following description, the same reference numerals are given to the same components, and the description will be appropriately omitted. In addition, in this specification, an "average fiber diameter" and an "average particle diameter" mean a median diameter, respectively.

Figure 1B:
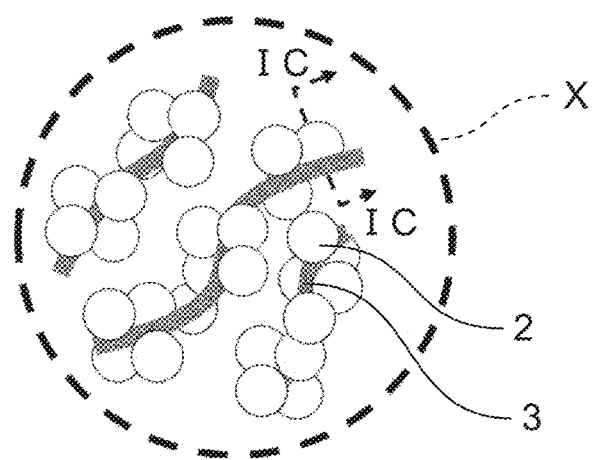
FIG. 1B is an enlarged view of an X portion surrounded by a broken line in FIG. 1A.
Figure 1C:
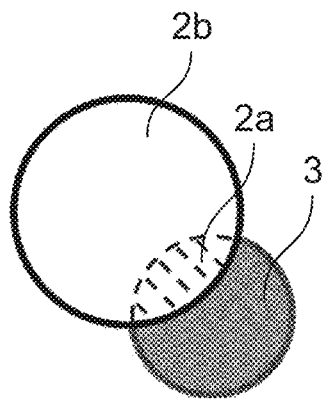
FIG. 1C is a cross-sectional view taken along line IC-IC illustrated in FIG. 1B.
Figure 1D:
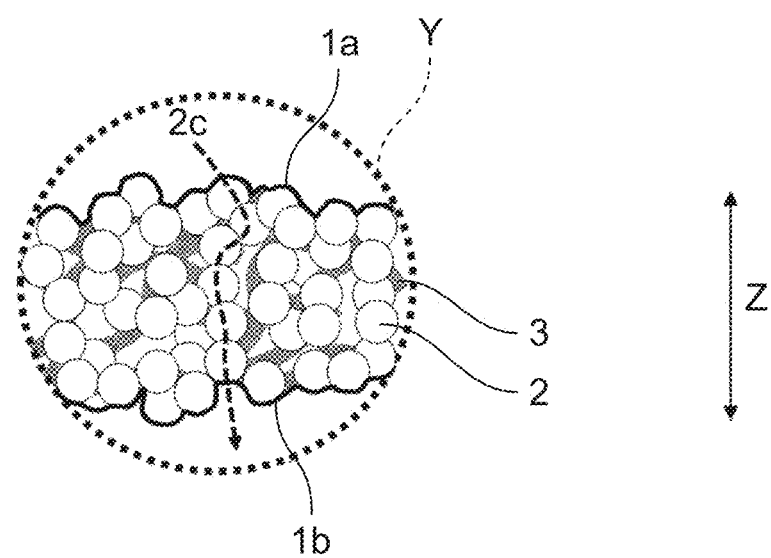
FIG. 1D is an enlarged view of a Y portion (cross-sectional portion) surrounded by a dotted line in FIG. 1A.
Figure 2:
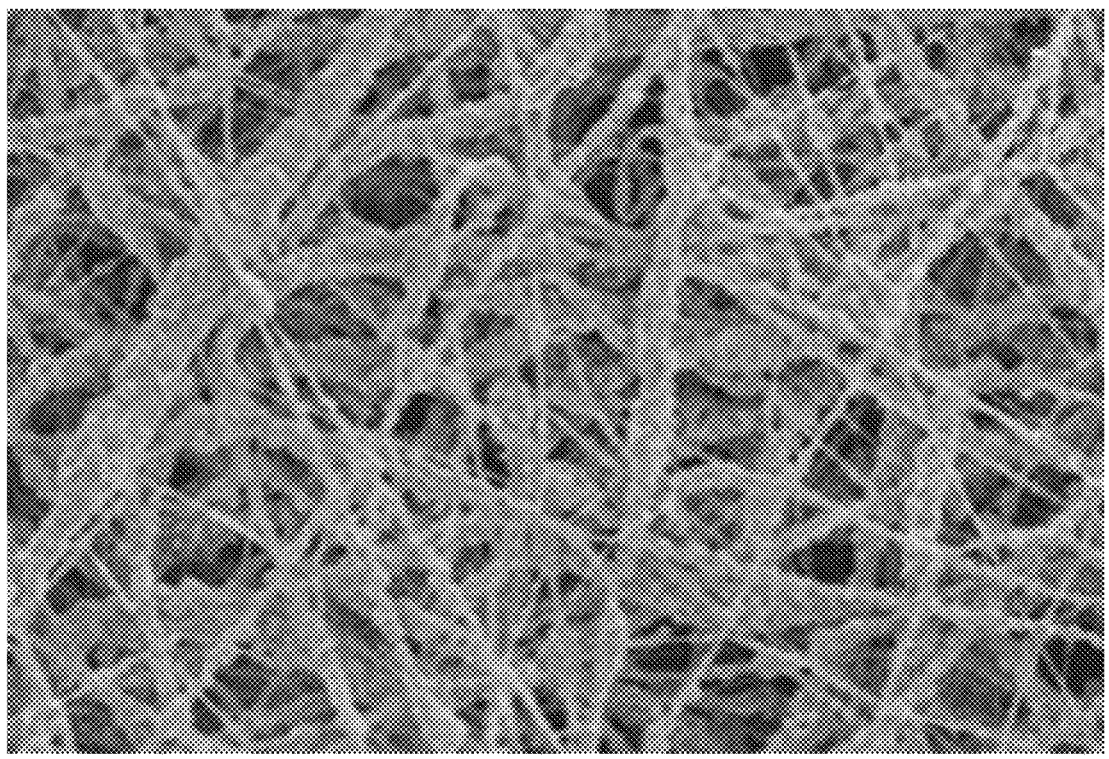
FIG. 2 is a scanning electron micrograph of an outside surface of the ion permeable membrane according to the embodiment of the present disclosure.
Figure 6A:
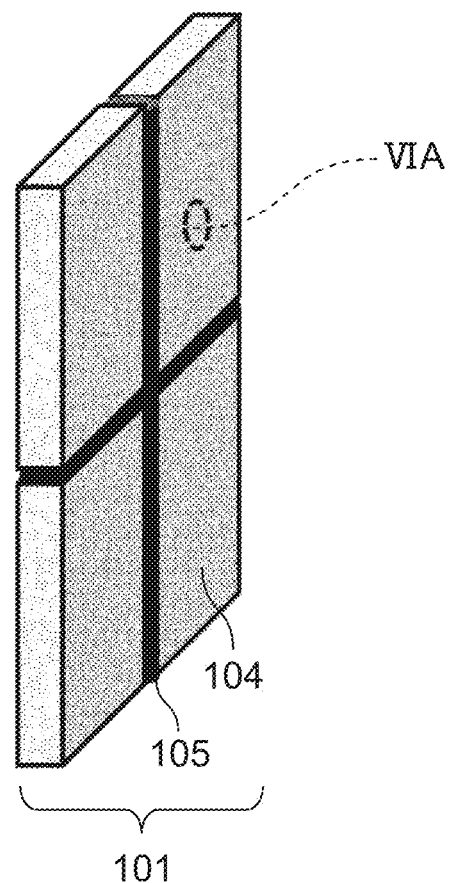
FIG. 6A is a schematic diagram of an ion permeable membrane in the related art.
Figure 6B:
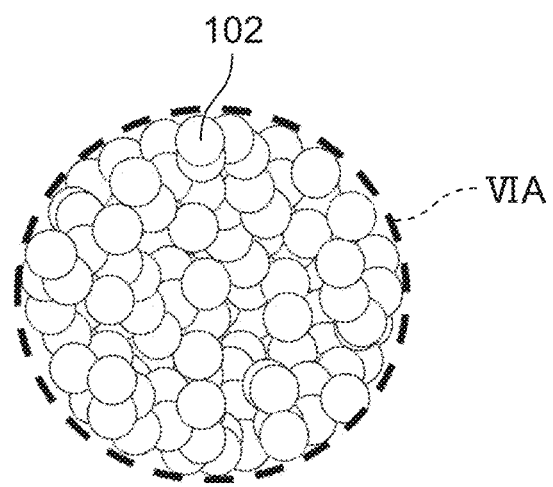
FIG. 6B is an enlarged view of a VIA portion surrounded by a broken line in FIG. 6A.

FIG. 1A illustrates a schematic diagram of an ion permeable membrane according to an embodiment of the present disclosure, FIG. 1B illustrates an enlarged view of an X portion surrounded by a broken line in FIG. 1A, FIG. 1C illustrates a cross-sectional view taken along line IC-IC illustrated in FIG. 1B, and FIG. 1D is an enlarged view of a Y portion (cross-sectional portion) surrounded by a dotted line in FIG. 1A. FIG. 2 is a scanning electron micrograph of an outside surface of the ion permeable membrane according to the embodiment of the present disclosure. For comparison, FIGS. 6A and 6B illustrate schematic diagrams of an ion permeable membrane in the related art.

As illustrated in FIG. 1B, ion permeable membrane 1 according to the embodiment of the present disclosure includes ion conductor particles 2 and fiber base materials 3. As illustrated in FIG. 1C, ion conductor particle 2 has a portion (hereinafter, also referred to as "embedment") $2a$ embedded inside fiber base material 3 (hatched portion hatched in FIG. 1C), and a portion (hereinafter, also referred to as "exposer") $2b$ exposed on the outside surface. It is possible to fix ion conductor particle 2 to fiber base material 3 by embedment $2a$, while imparting an ion permeation function of ion permeable membrane 1 by exposer $2b$.

That is, embedment $2a$ is a portion of ion conductive particle 2 that overlaps fiber base material 3. In other words, in embedment $2a$, ion conductive particle 2 and fiber base material 3 are mixed. In addition, exposer $2b$ is a portion of ion conductive particle 2 other than embedment $2a$. That is, ion conductive particle 2 is configured to include embedment $2a$ and exposer $2a$.

As illustrated in FIG. 1D, ion permeable membrane 1 according to the embodiment of the present disclosure is continuous in the thickness direction Z of ion permeable membrane 1 from upper surface $1a$ to lower surface $1b$ of ion permeable membrane 1 while exposers $2b$ of a plurality of ion conductor particles 2 are in contact with each other. As described above, exposer $2b$ is continuous from upper surface $1a$ to lower surface $1b$, so that ion conduction path $2c$ (arrow with a broken line) is formed and ion permeable membrane 1 has the ion permeation function.

In addition, it is preferable that a plurality of fiber base materials 3 are in contact with each other, and it is more preferable that fiber base materials 3 are fused to each other at this contact portion. As a result, a mechanical strength of the ion permeable membrane, particularly an elongation at break is improved.

As illustrated in FIG. 2, ion conductor particles 2 are at least partially embedded and firmly fixed inside flexible fiber base material 3. By adopting such a structure, in a case where a large amount of stock solution is treated at high speed, even when a high pressure is applied, it is not broken, and ion conductor particles 2 can be significantly prevented from falling off.

On the other hand, as illustrated in FIG. 6A, above-described ion permeable membrane 101 in the related art has a structure in which sintered body 104 is joined at adhesion 105, and as illustrated in FIG. 6B, ion conductor particles 102 have a significantly dense structure and have significantly few voids including an outside surface. Therefore, a hardness is high, whereas it is significantly brittle, so that it is likely to be fragile, and the joining is likely to be separated at adhesion 105.

For example, for ion conductor particles 2 according to the embodiment of the present disclosure, an inorganic compound including Li such as lithium nitride ($Li_3N$) which is a lithium ion conductor, $Li_{10}GeP_2S_{12}$, $(La_x, Li_y)TiO_z$ (herein, $x=\frac{2}{3}-a$, $y=3a-2b$, $z=3-b$, $0<a\leq\frac{1}{6}$, $0\leq b\leq 0.06$, $y>0$), $Li_{1+x+y}Al_x(Ti, Ge)_{2-x}Si_yP_{3-y}O_{12}$ which is a Li substitution type Na Super Ionic Conductor (NASICON) type crystal (herein, $0\leq x\leq 0.6$, $0\leq y\leq 0.6$) can be used. All of these materials illustrate high Li ion conduction rate of $10^{-4}$ to $10^{-3}$ $Scm^{-1}$ or more. Ion conductor particle 2 is not limited to the above material as long as ion conductor particle 2 has ion conductivity. In a case where the ion conduction rate is $10^{-7}$ $Scm^{-1}$ or more, it is determined to have the ion conductivity.

The average particle diameter of ion conductor particles 2 according to the embodiment of the present disclosure is preferably set to 50 nm or more and 500 μm or less in order to realize a configuration in which ion conductor particles 2 include embedment $2a$ and exposer $2b$.

A ratio of ion conductor particles 2 according to the embodiment of the present disclosure to a total volume of ion conductor particles 2 and fiber base material 3 is preferably 30% by volume or more. By setting the ration in this range, ion conductor particles 2 are likely to come into contact with each other in the ion permeable membrane, and ion conduction path $2c$ is likely to be formed. The ratio is more preferably 35% by volume or more, and even more preferably 40% by volume or more.

In addition, the above ratio is preferably set to 95% by volume or less. As a result, fiber base material 3 occupies a certain volume or more, a sufficient elongation at break can be secured, and embedment $2a$ of the ion conductor particles can be likely to be secured to prevent the ion conductor particles from falling off. The ratio is more preferably 90% by volume or less, and even more preferably 85% by volume or less.

It is desirable that fiber base material 3 according to the embodiment of the present disclosure includes any one selected from the group consisting of a homopolymer of vinylidene fluoride and a copolymer thereof, a homopolymer of tetrafluoroethylene and a copolymer thereof, and a homopolymer of chlorotrifluoroethylene and a copolymer thereof, and it is not limited to the above materials as long as it has hydrophobicity and flexibility. By having hydrophobicity, it is possible to effectively suppress a phenomenon (hereinafter, also referred to as "crossover phenomenon") in which an object to be treated by the ion permeable membrane, for example, seawater permeates the ion permeable membrane as it is. By having flexibility, high durability can be imparted to the ion permeable membrane. For example, in a case where the water absorption measured by the ASTM D-570 test method is 0.1% or less, it is determined that the material has hydrophobicity, and in a case where the elongation at break measured by the JIS K7161 test method is 1% or more, it is determined that the material has flexibility.

Figure 3A:
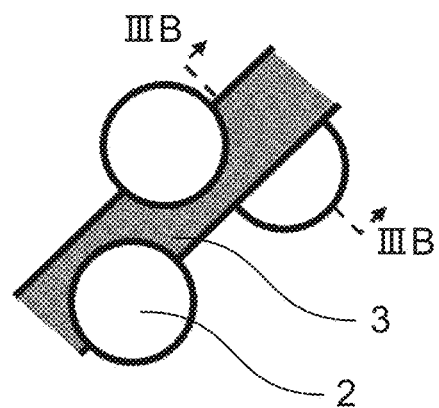
FIG. 3A is an enlarged schematic diagram of one fiber in the ion permeable membrane according to the embodiment of the present disclosure in a case where an average fiber diameter of fibers in a base material is slightly smaller than an average particle diameter of ion conductor particles.
Figure 3B:
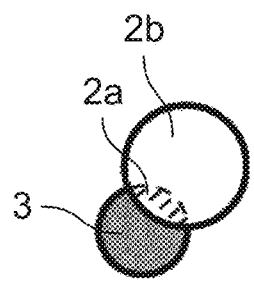
FIG. 3B is a cross-sectional view taken along line IIIB-IIIB of the fiber illustrated in FIG. 3A.

FIG. 3A is an enlarged schematic diagram of one fiber in the ion permeable membrane according to the embodiment of the present disclosure in a case where an average fiber diameter of fibers in a base material is slightly smaller than an average particle diameter of ion conductor particles, and 3B is a cross-sectional view taken along line IIIB-IIIB of the fiber illustrated in FIG. 3A. As illustrated in FIG. 3B, since embedment $2a$ of ion conductor particle 2 is sufficiently secured, ion conductor particle 2 can be firmly fixed to fiber base material 3 and exposer $2b$ of ion conductor particle 2 can also be secured sufficiently large. Therefore, since ion conductor particles 2 can be carried on the outside surface of fiber base material 3 in a state of being sufficiently exposed, ion conductor particles 2 can be prevented from falling off and the ion permeation function can be sufficiently exerted. When embedment 2a of ion conductor particle 2 is 5% or more by volume, it can be said that embedment 2a is sufficiently secured. In addition, when the exposer of ion conductor particle 2 is 50% or more by volume, it can be said that exposer 2b is sufficiently secured.

The volume of exposer 2b may be calculated from, for example, an image obtained from a scanning electron microscope as illustrated in FIG. 2. Specifically, for example, exposer 2b is specified by performing binarization processing on the image. The volume of exposer 2b may be estimated from the ratio of exposer 2b on the image.

Figure 3C:
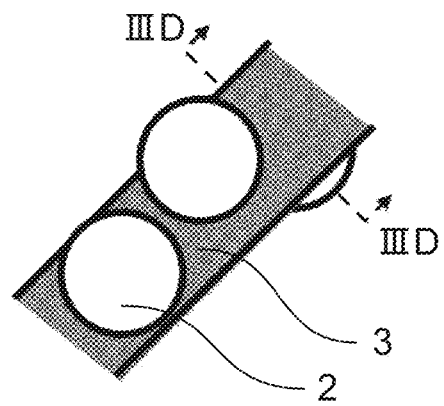
FIG. 3C is an enlarged schematic diagram of one fiber in the ion permeable membrane according to the embodiment of the present disclosure in a case where an average fiber diameter of the fibers in the base material is larger than an average particle diameter of the ion conductor particles.
Figure 3D:
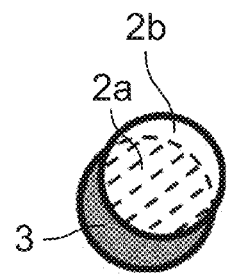
FIG. 3D is a cross-sectional view taken along line IIID-IIID of the fiber illustrated in FIG. 3C.

FIG. 3C is an enlarged schematic diagram of one fiber in the ion permeable membrane according to the embodiment of the present disclosure in a case where an average fiber diameter of the fibers in the base material is larger than an average particle diameter of the ion conductor particles, and FIG. 3D is a cross-sectional view taken along line IIID-IIID of the fiber illustrated in FIG. 3C. As illustrated in FIG. 3D, since embedment 2a of ion conductor particle 2 is sufficiently secured, ion conductor particle 2 can be firmly fixed to fiber base material 3, and as a result, ion conductor particle 2 can be prevented from falling off. However, since exposer 2b of ion conductor particle 2 is substantially absent, that is, ion conductor particle 2 is not substantially exposed on the outside surface of fiber base material 3, the ion permeation function is inferior to that in the case of FIGS. 3A and 3B.

Figure 3E:
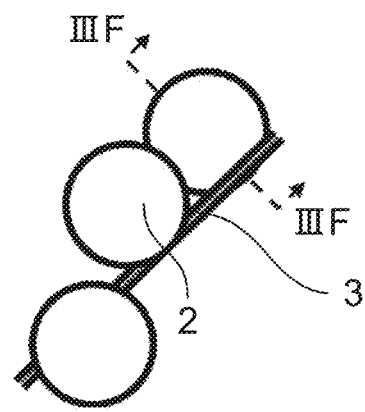
FIG. 3E is an enlarged schematic diagram of one fiber of the fiber base material in the ion permeable membrane according to the embodiment of the present disclosure in a case where an average fiber diameter of the fibers in the base material is 0.2 times or less an average particle diameter of the ion conductor particles.
Figure 3F:
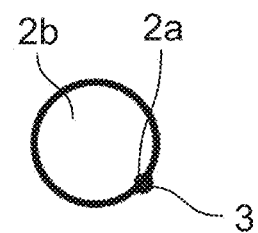
FIG. 3F is a cross-sectional view taken along line IIIF-IIIF of the fiber illustrated in FIG. 3E.

FIG. 3E is an enlarged schematic diagram of one fiber of the fiber base material in the ion permeable membrane according to the embodiment of the present disclosure in a case where an average fiber diameter of the fibers in the base material is 0.2 times or less an average particle diameter of the ion conductor particles, and FIG. 3F is a cross-sectional view taken along line IIIF-IIIF of the fiber illustrated in FIG. 3E. As illustrated in FIG. 3F, since embedment 2a of ion conductor particle 2 is not substantially secured, ion conductor particle 2 is likely to fall off as compared with the case of FIGS. 3A to 3D.

As a result, when the average fiber diameter of fibers in the base material 3 according to the embodiment of the present disclosure is denoted by A nanometer (nm) and the average particle diameter of ion conductor particles 2 is denoted by B nanometer (nm), it is desirable to satisfy $B \times 0.2 < A < B$. More preferably, $B \times 0.2 < A < B \times 0.75$ is satisfied, and even more preferably, $B \times 0.2 < A < B \times 0.5$ is satisfied.

The ion permeable membrane according to the embodiment of the present disclosure may include other members other than ion conductor particles 2 and fiber base material 3 within a range in which the object of the present disclosure is achieved.

The thinner the membrane thickness of the ion permeable membrane according to the embodiment of the present disclosure, the more the ion permeation function is improved, but the durability is reduced, so that the ion permeable membrane can be designed in an optimum range depending on use conditions.

The porosity of the ion permeable membrane according to the embodiment of the present disclosure is preferably 10% or more and 30% or less. When the porosity is 10% or more, unevenness can be effectively formed on upper surface 1a and lower surface 1b of the ion permeable membrane, a contact area with the object to be treated by the ion permeable membrane (when the target is a liquid such as seawater, liquid contact area) can be increased, and the ion permeation function can be improved. In addition, when the porosity is 30% or less, the crossover phenomenon can be effectively suppressed. In addition, ion conduction path 2c is likely to be formed. The porosity can be calculated by the following formula (1) in a case where the ion permeable membrane includes the ion conductor particles and the fiber base material.

$$\text{Porosity (\%)} = 1 - W/(V \times (D_i \times r_i + D_f \times r_f)) \times 100 \quad (1)$$

Here, W is the weight (g) of the ion permeable membrane, V is the volume (cm$^3$) of the ion permeable membrane, $D_i$ is the density (g/cm$^3$) of the ion conductor particles, $r_i$ is the volume ratio (%) of the ion conductor particles to the total volume of the ion conductor particles and the fiber base material, $D_f$ is the density (g/cm$^3$) of the fiber base material, and $r_f$ is the volume ratio (%) of the fiber base material to the total volume of the ion conductor particles and the fiber base material.

The ion permeable membrane according to the embodiment of the present disclosure has high durability that enables a high-speed treatment of a large amount of stock solution. Specifically, a mechanical strength such as a particle dropout rate of 40% by weight or less and an elongation at break of 1% or more described later is illustrated, which enables durability even when a large amount of stock solution is treated at high speed. For example, it is also possible to prevent the membrane from being broken by pressure or losing the ion permeation function. The particle dropout rate is preferably 20% by weight or less, and more preferably 0% by weight. The elongation at break is preferably 5% or more, and more preferably 15% or more.

As the ion permeation function of the ion permeable membrane according to the embodiment of the present disclosure, for example, in the case of an ion permeable membrane using Li ion conductor particles, specifically, for an ion recovery rate and an ion transfer rate described later, the ion recovery rate of Li ions can be set to 0.1% or more and the ion transfer rate can be set to 0.05 mg/hr or more while the ion recovery rate of other than Li ions is set to 0.0% and the ion transfer rate is set to 0.00 mg/hr. The ion recovery rate of Li ions is preferably 1% or more, and more preferably 5% or more. The ion transfer rate of Li ions is preferably 0.2 mg/hr or more, and more preferably 1 mg/hr or more.

The above has exemplified the case of the ion permeable membrane using Li ion conductor particles, and the same applies to the case of using ion conductor particles other than Li ions. For example, in the case of an ion permeable membrane using Na ion conductor particles, the ion recovery rate of Na ions can be set to 0.1% or more and the ion transfer rate can be set to 0.05 mg/hr or more while the ion recovery rate of other than Na ions is set to 0.0% and the ion transfer rate is set to 0.00 mg/hr.

The ion permeable membrane according to the embodiment of the present disclosure may be used alone for ion permeation, or may be incorporated in an ion permeation device such as an electrodialysis device.

When the ion permeable membrane is incorporated in the ion permeation device, in a case where a large amount of stock solution is treated at high speed, it is possible to realize an ion permeation device and an ion permeation method in which even when a high pressure is applied, it is unlikely to be broken, and ion conductor particles 2 are significantly prevented from falling off.

Regarding the ion permeation method, the ion permeable membrane may be brought into contact with a solvent such as water including desired ions, soil, and industrial waste.

It is desirable that the soil, industrial waste and the like with which the ion permeable membrane is brought into contact are wet with a solvent such as water. When the ion permeable membrane is brought into contact with a solvent such as water, the ion permeation is efficiently performed. In order to separate desired ions contained in a solvent such as water, soil, and industrial waste, when ultrasonic treatment or bubbling treatment with a micro or nano bubble generator is used as necessary, the ion permeation is performed more efficiently.

Next, a method of manufacturing the ion permeable membrane according to the embodiment of the present disclosure will be described.

The method of manufacturing the ion permeable membrane according to the embodiment of the present disclosure includes a step of producing a raw material and a step of spinning the produced raw material as a fiber.

In the step of producing the raw material, ion conductor particles 2 and a resin as the material of fiber base material 3 are mixed. At this time, it is possible to disperse in a solvent using a kneader, and in the case of a thermoplastic resin, dry blending using a powder mixer can also be performed.

In the step of spinning as fibers, in a case where the produced raw material is a liquid, the liquid can be spun by a wet spinning method such as a normal electrospinning method.

In a case of spinning by the electrospinning method, the fiber diameter of fiber base material 3 can be adjusted by the weight solid content concentration of the raw material of fiber base material 3 contained in the raw material liquid. That is, the fiber diameter of fiber base material 3 can be increased by increasing the weight solid content ratio of the raw material of fiber base material 3, and the fiber diameter of fiber base material 3 can be reduced by reducing the weight solid content ratio of the raw material of fiber base material 3.

In the embodiment of the present disclosure, in order to sufficiently secure embedment 2a and exposer 2b of ion conductor particle 2, the fiber diameter of fiber base material 3 may be appropriately adjusted depending on the weight solid content ratio of the raw material of fiber base material 3 in relation to the average particle diameter of ion conductor particles 2. The fiber diameter changes depending on the physical properties of the raw material (volume resistivity, dielectric constant, viscosity, and the like).

In addition, in a case where the produced raw material is a dry blending of powders, the dry blend of powders can be spun by a normal melt spinning method or a spinning method combining the melt spinning method and the electrospinning method.

The method of manufacturing the ion permeable membrane according to the embodiment of the present disclosure may further include a step of pressing. In the step of pressing, the membrane spun as fibers can be pressed by a normal flat plate press or a roll press device. At this time, it is also possible to perform hot pressing by applying a temperature at which the resin, which is the material of ion conductor particles 2 and fiber base material 3, does not melt or deteriorate.

Figure 4:
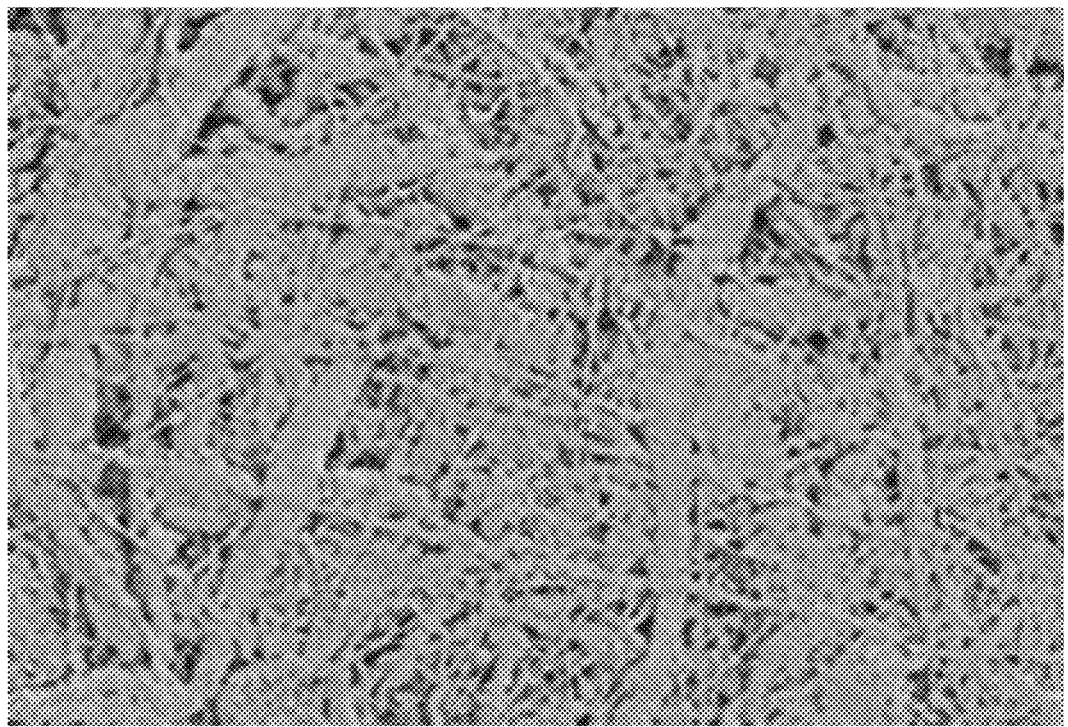
FIG. 4 is a scanning electron micrograph of an outside surface of the ion permeable membrane according to the embodiment of the present disclosure after pressing.

The porosity can be adjusted by this step of pressing. FIG. 4 is a scanning electron micrograph of an outside surface of the ion permeable membrane according to the embodiment of the present disclosure after pressing, and it is found that the voids are reduced as compared with FIG. 2.

In addition, exposers 2b of the plurality of ion conductor particles 2 are more reliably brought into contact with each other by this step of pressing, and the ion permeation function of the ion permeable membrane is further improved by forming more ion conduction paths 2c. In addition, in the plurality of fiber base materials 3, fiber base materials 3 come into contact with each other more reliably, and the mechanical strength of the ion permeable membrane is improved.

EXAMPLE

Hereinafter, each example and each comparative example performed by the present inventors will be described.

Example 1

An ion permeable membrane was manufactured by the following manufacturing method. As the ion conductor particles, lithium ion conductive glass ceramics powder (LICGC powder material manufactured by Ohara Co., Ltd.) was weighed so that the weight ratio was 68% (55% by volume) with respect to the total amount of polyvinylidene fluoride resin (Dyneion fluoropolymer manufactured by 3M Corporation), and the ion conductor particles were dispersed in this mixture while dissolving polyvinylidene fluoride in dimethylacetamide (DMA) using a homomixer so that the weight solid content ratio was 35%. A high voltage of 20 kV was applied to the produced dispersion liquid in this manner through a metal needle nozzle having an inner diameter φ of 720 μm at a temperature of 23° C. and a humidity of 50%, and fiber formation was performed by an electrospinning method to produce a spinning membrane. Conditions other than the above, such as the liquid feed pressure and the spinning distance, are adjusted so that droplets are not generated and the fibers can be completely formed. The produced spinning membrane was pressed by a roll press device to adjust the porosity and cut into a 50 mm square size to produce an ion permeable membrane.

Next, various evaluation items will be specifically described.

Average Particle Diameter of Ion Conductor Particles

For the ion conductor particles (lithium ion conductive glass ceramics powder) dispersed in water, the particle size distribution measuring device (MT-3300EXII, manufactured by Microtrac Bell Co., Ltd.) was used to measure the 50% particle diameter (D50) in the volume-based integrated fraction obtained by particle size distribution measurement by a laser diffraction and scattering method based on JIS Z8825 (2013), and a result of 400 nm was obtained.

Average Fiber Diameter of Fibers in Base Material

Using a scanning electron microscope (SEM. Phenom G2Pro manufactured by Phenom-World Co., Ltd.), 10 sheets of outside surface images of the produced ion permeable membrane were obtained at a magnification such that several tens of fibers were displayed. Ten fibers were randomly selected from one SEM image, and a total of 100 fibers selected from the ten SEM images were measured for fiber diameters where the ion conductor particles were not embedded. A median fiber diameter was calculated from the measured results, and a result of 100 nm was obtained.

Membrane Thickness and Porosity of Ion Permeable Membrane

The membrane thickness was measured with a digital micrometer without crushing so as not to change the density and internal structure of the ion permeable membrane cut into a size of 50 mm square, the weight and the density of the raw material were obtained, and thereafter the porosity was calculated from the above formula (1). As a result of the measurement, the membrane thickness was 178 μm, each of the densities of the lithium ion conductive glass ceramics powder and the polyvinylidene fluoride resin was 3.05 g/cm³ and 1.78 g/cm³, and the weight of the ion permeable membrane was 0.84 g. Therefore, a result that the porosity was 23.6% was obtained.

Ion Recovery Rate, Ion Transfer Rate, and Particle Dropout Rate

Figure 5:
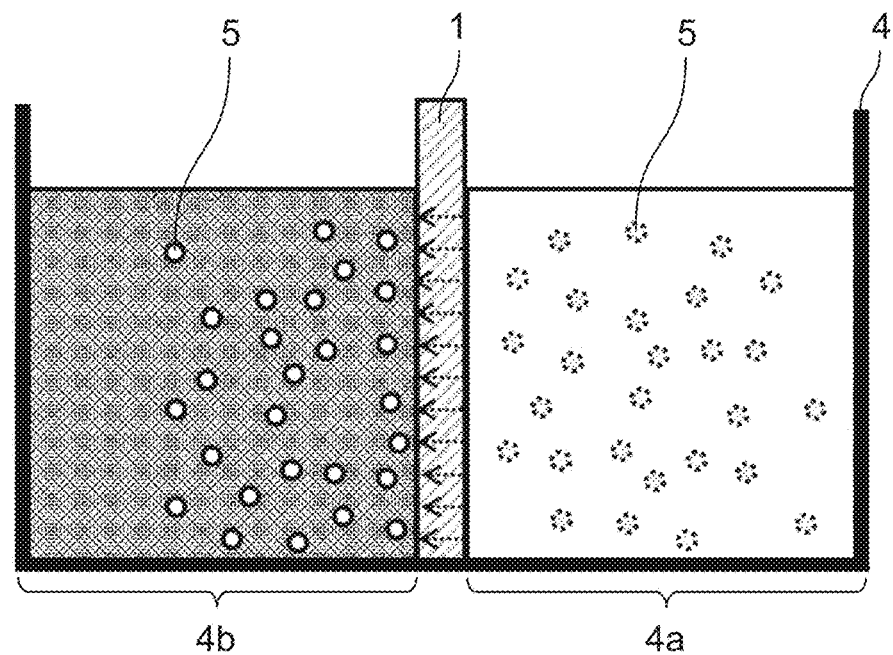
FIG. 5 is a schematic sectional view illustrating an ion permeation function evaluation method of the ion permeable membrane according to the embodiment of the present disclosure.

FIG. 5 is a schematic diagram illustrating an ion permeation function evaluation method of the ion permeable membrane according to the embodiment of the present disclosure. Storage tank 4 as illustrated in FIG. 5 was partitioned into stock solution side 4a and recovery side 4b by the produced 50 mm square ion permeable membrane 1, ions 5 were put into stock solution side 4a, and only pure water was put into recovery side 4b. As ions 5, Li ions, Ni ions, and Co ions were put into pure water at a concentration of 100 ppm, respectively. While stirring stock solution side 4a with a magnetic stirrer, each ion transfer amount on recovery side 4b was measured every hour for 5 hours by an inductively coupled plasma emission spectrometer (iCAP7400 manufactured by Thermo Fisher Scientific Co., Ltd.). The ratio (percentage) obtained by dividing each ion transfer amount (mg) after 5 hours by each ion amount (mg) on the initial stock solution side was calculated as each ion recovery rate (%). For the ion transfer rate, the maximum value of the ion transfer amounts (mg) measured every hour was adopted, and the value (mg/hr) obtained by dividing the maximum value by one hour was defined as the ion transfer rate. The Li ion recovery rate was 7.1%, and the Li ion transfer rate was 2.24 mg/hr. On the other hand, for Ni ions and Co ions, the result was obtained that the ion recovery rate was 0.0% and ion transfer rate was 0.00 mg/hr. In addition, the weight change of the ion permeable membrane was measured before and after this measurement, this ratio was calculated as a particle dropout rate, and a result of 0% by weight was obtained. The ion permeable membrane after the measurement is sufficiently dried and the weight is measured in a state where the water content is removed.

Elongation at Break

The obtained ion permeable membrane was cut into a strip-shaped test piece having a width of 10 mm and a length of 50 mm, and the elongation at break was measured with a tensile tester (RTF-1310 manufactured by AND Co., Ltd.). A result that the elongation at break was 18% was obtained.

Example 2

In Example 2, an ion permeable membrane was produced in the same manner as in Example 1 except that the sum of the weight solid content ratios of the ion conductor particles and the polyvinylidene fluoride resin was 50%. Regarding the evaluation, the same evaluation as in Example 1 was performed. In the fiber formation by the electrospinning method, it is normally known that the higher the weight solid content concentration of the resin contained in the raw material liquid, the thicker the fiber diameter, and the lower the concentration, the thinner the fiber diameter. In Example 2, the average fiber diameter of the fibers in the base material is larger than that in Example 1 due to this effect.

Example 3

In Example 3, an ion permeable membrane was produced in the same manner as in Example 1 except that the sum of the weight solid content ratios of the ion conductor particles and the polyvinylidene fluoride resin was 30%. Regarding the evaluation, the same evaluation as in Example 1 was performed. In Example 3, the average fiber diameter of the fibers in the base material can be made smaller than that of Example 1 due to the same effect as in Example 2.

Example 4

In Example 4, an ion permeable membrane was produced in the same manner as in Example 1 except that the sum of the weight solid content ratios of the ion conductor particles and the polyvinylidene fluoride resin was 55%. Regarding the evaluation, the same evaluation as in Example 1 was performed. In Example 4, the average fiber diameter of the fibers in the base material can be further increased due to the same effect as in Example 2.

Comparative Example 1

In Comparative Example 1, a lithium ion conductive glass ceramics sintered body (LICGC sintered body manufactured by OHARA Co., Ltd. 50 mm square size) was used as the ion permeable membrane. Regarding the evaluation, the same evaluation as in Example 1 was performed.

Table 1 illustrates the measurement results in Examples 1 to 4 and Comparative Example 1. Although not illustrated in Table 1, the ion recovery rate of Ni ions and Co ions in each of Examples 1 to 4 and Comparative Example 1 was 0.0%, and the ion transfer rate was 0.00 mg/hr. In addition, the performance of the ion permeable membrane was determined as follows.

Regarding the particle dropout rate, 0% by weight was AA, more than 0% by weight and 20% by weight or less was A, more than 20% by weight and 40% by weight or less was B, and more than 40% by weight was C.

Regarding the elongation at break, 15% or more was AA, 5% or more and less than 15% was A, 1% or more and less than 5% was B, and less than 1% was C.

Regarding the ion recovery rate of Li ions, 5% or more was AA, 1% or more and less than 5% was A, 0.1% or more and less than 1% was B, and less than 0.1% was C.

Regarding the ion transfer rate of Li ions, 1 mg/hr or more was AA, 0.2 mg/hr or more and less than 1 mg/hr was A, 0.05 mg/hr or more and less than 0.2 mg/hr was B, and less than 0.05 mg/hr was C.

B or higher were regarded as good results, of which A was the better result and AA was the best result. C was regarded as a bad result.

Regarding the overall determination, the worst determination among the four performances (that is, particle dropout rate, elongation at break, Li ion recovery rate, and Li ion transfer rate) was described.

TABLE 1

| Configuration of ion permeable membrane | | |
|---|---|---|
| Ion conductor particle ratio % by | Ion | Average fiber diameter of fibers in |

TABLE 1-continued

| | weight/ % by volume | conductor particle nm | base material nm | Membrane thickness μm | Porosity % |
|---|---|---|---|---|---|
| Example 1 | 68/55 | 400 | 100 | 178 | 23.6 |
| Example 2 | 68/55 | 400 | 390 | 183 | 20.2 |
| Example 3 | 68/55 | 400 | 80 | 183 | 28.5 |
| Example 4 | 68/55 | 400 | 420 | 185 | 19.2 |
| Comparative Example 1 | 100/100 | — | — | 180 | 7.1 |

| | Performance of ion permeable membrane | | | | | | | |
|---|---|---|---|---|---|---|---|---|
| | Mechanical strength | | | | Ion permeation function | | | |
| | Particle dropout rate | | Elongation at break | | Li ion recovery rate | | Li ion transfer rate | Overall |
| | % by weight | Determination | % | Determination | % | Determination | mg/hr Determination | determination |
| Example 1 | 0 | AA | 18 | AA | 7.1 | AA | 2.24 AA | AA |
| Example 2 | 0 | AA | 20 | AA | 1.3 | A | 0.41 A | A |
| Example 3 | 30 | B | 10 | A | 7.8 | AA | 2.46 AA | B |
| Example 4 | 0 | AA | 22 | AA | 0.2 | B | 0.06 B | B |
| Comparative Example 1 | 0 | AA | 0.5 | C | 0.3 | B | 0.11 B | C |

As illustrated in Table 1, in Examples 1 to 4, the overall determination was B or higher, and the ion permeable membrane performance was good. Among these, in Examples 1 and 2, the overall determination was A or higher, and the ion permeable membrane performance was better, of which the overall determination in Example 1 was AA and the ion permeable membrane performance was best.

On the other hand, in Comparative Example 1, the overall determination was C, and the ion permeable membrane performance was poor. In Comparative Example 1, since the sintered body is used as the ion permeable membrane, the ion conductor particles have a significantly dense structure, the elongation at break indicating fragility is 0.5%, and it is found that the ion permeable membrane is significantly brittle (or easy to break). In addition, since the porosity is as low as 7.1% and the liquid contact area on the outside surface of the ion permeable membrane is small, the Li ion recovery rate is 0.3% and the Li ion transfer rate is 0.11 mg/hr, which is a low result as compared with Examples 1 to 3.

Hereinafter, differences in performance of the ion permeable membranes of Examples 1 to 4 will be considered. In Examples 1 and 2 in which the ion conductor particles are at least partially embedded and firmly fixed inside the flexible fiber base material, since the porosity of the ion permeable membrane is significantly high at 20% or more, and it can contribute to the ion permeation not only to the liquid contact on the outside surface of the ion permeable membrane but also to the inside of the ion permeable membrane, the Li ion recovery rate and the Li ion transfer rate can be improved as compared with Comparative Example 1. It is confirmed that the crossover phenomenon in which the liquid itself moves instead of the ions is not occurred. In addition, the elongation at break indicating fragility are high at 18% and 20%, respectively, and it is found that the ion permeable membrane that is flexible and is not easily broken can be realized. The particle dropout rate does not change before and after the measurement of ion permeation, and the result that the ion conductor particles could be firmly fixed to the fiber base material is obtained.

Here, comparing Example 1 and Example 2, the fact that the Li ion recovery rate and the Li ion transfer rate tend to be higher in Example 1 means that both average particle diameters of the ion conductor particles are 400 μm, whereas in Example 1, the average fiber diameter of the fibers in the base material is 100 μm, which is 0.25 times, and this is because the ion conductor particles can be carried on the surface of the fiber base material in a state of being sufficiently exposed. On the contrary, in Example 2, the average fiber diameter of the fibers in the base material was 390 μm, which was slightly smaller than the average particle diameter of the ion conductor particles, and this is because the amount of ion conductor particles exposed on the outside surface of the fiber base material is reduced.

In Example 3 in which the average fiber diameter of the fibers in the base material is thinned to 80 μm and is 0.2 times the average particle diameter of the ion conductor particles, since the porosity is significantly high at 28.5%, the Li ion recovery rate is 7.8% and the Li ion transfer rate is 2.46 mg/hr, which illustrate a high ion permeation function, and since the fiber diameter of the fiber base material is small, the elongation at break is 10%, which is weaker than those in Examples 1 and 2. In addition, as for the particle dropout rate, the result was that 30% by weight was fallen off before and after the ion permeation measurement, and it is found that when the fiber diameter of the fiber base material is too small, there are few portions where the ion conductor particles are embedded inside the fiber base material, and the structure is relatively easy to fall off.

In Example 4 in which the average fiber diameter of the fibers in the base material is thickened to 420 μm and is larger than the average particle diameter of the ion conductor particles, since the fiber diameter of the fiber base material is thickened, the porosity is reduced to 19.2% as compared with Examples 1 and 2, whereas the elongation at break is increased to 22%. However, since the fiber diameter of the fiber base material is larger than the average particle diameter of the ion conductor particles, the ion conductor particles are carried on the outside surface of the fiber base material in a state of being barely exposed. Therefore, the Li ion recovery rate is 0.2% and the Li ion transfer rate is 0.06 mg/hr, which is a low ion permeation function as compared with Examples 1 to 3. Since the ion conductor particles are barely exposed on the outside surface of the fiber base material, the particle dropout rate before and after the ion permeation measurement is 0% by weight.

From the above evaluation, according to the embodiment of the present disclosure, the ion conductor particle and the fiber base material are included, and the ion conductor particle includes a portion embedded inside the fiber base material, and a portion exposed on an outside surface of the fiber base material. Therefore, it is found that it is possible to provide the ion permeable membrane having high durability that enables a high-speed treatment of a large amount of stock solution and exhibiting a sufficient ion permeation function which selectively and efficiently permeates ions.

Aspect 1 of the present disclosure is an ion permeable membrane including an ion conductor particle and a fiber base material, in which the ion conductor particle has a portion where the ion conductor particles are embedded inside the fiber base material and a portion where the ion conductor particles are exposed outside surfaces of the fiber base material, and the exposed portion is continuous from an upper surface to a lower surface in a thickness direction of the ion permeable membrane.

The ion permeable membrane according to Aspect 1 of the present disclosure has high durability that enables a high-speed treatment of a large amount of stock solution.

Aspect 2 of the present disclosure is the ion permeable membrane according to Aspect 1, in which the ion conductor particle is an inorganic compound including lithium (Li).

Aspect 3 of the present disclosure is the ion permeable membrane according to Aspect 1 or 2, in which the fiber base material is hydrophobic.

Aspect 4 of the present disclosure is the ion permeable membrane according to any one of Aspects 1 to 3, in which the fiber base material includes any one selected from the group consisting of a homopolymer of vinylidene fluoride and a copolymer thereof, a homopolymer of tetrafluoroethylene and a copolymer thereof, and a homopolymer of chlorotrifluoroethylene and a copolymer thereof.

Aspect 5 of the present disclosure is the ion permeable membrane according to any one of Aspects 1 to 4, in which in a case where an average fiber diameter of the fibers in the base material is denoted by A nanometer (nm) and an average particle diameter of the ion conductor particles is denoted by B nanometer (nm), $B \times 0.2 < A < B$ is satisfied.

The ion permeable membrane according to Aspect 5 of the present disclosure can exhibit a sufficient ion permeation function which selectively and efficiently permeates ions.

INDUSTRIAL APPLICABILITY

The ion permeable membrane according to the embodiment of the present disclosure has higher flexibility than the ion permeable membrane made of a sintered body in the related art and can realize a high specific surface area. Therefore, the ion permeable membrane can be used for efficiently recovering rare metals, particularly lithium, from a waste liquid, a waste material, a low-concentration stock solution, and the like, by selectively permeating ions.

What is claimed is:

1. An ion permeable membrane comprising:
   ion conductor particles; and
   a fiber base material,
   wherein each of the ion conductor particles has a first portion embedded inside the fiber base material and a second portion exposed outside surfaces of the fiber base material,
   wherein the second portions of the ion conductor particles are continuous between an upper surface and a lower surface in a thickness direction of the ion permeable membrane while the second portions of a plurality of the ion conductor particles are in contact with each other, and
   wherein in a case where an average fiber diameter of fibers in the fiber base materials is denoted by A nanometer (nm) and an average particle diameter of the ion conductor particles is denoted by B nanometer (nm), $B \times 0.2 < A < B$ is satisfied.

2. The ion permeable membrane of claim 1,
   wherein each of the ion conductor particles is an inorganic compound including lithium (Li).

3. The ion permeable membrane of claim 1,
   wherein the fiber base material is hydrophobic.

4. The ion permeable membrane of claim 1,
   wherein the fiber base material includes any one selected from the group consisting of a homopolymer of vinylidene fluoride and a copolymer thereof, a homopolymer of tetrafluoroethylene and a copolymer thereof, and a homopolymer of chlorotrifluoroethylene and a copolymer thereof.

* * * * *